United States Patent

Scaglione

[15] 3,695,449
[45] Oct. 3, 1972

[54] REGULATING STATION VALVE

[72] Inventor: Paul J. Scaglione, 30180 Richmond Hill Dr., Farmington, Mich. 48024

[22] Filed: April 13, 1970

[21] Appl. No.: 27,734

[52] U.S. Cl. ................... 210/429, 210/432, 137/546
[51] Int. Cl. ............................................. B01d 35/02
[58] Field of Search...... 210/232, 234, 418, 429, 431, 210/432; 137/544–547

[56] References Cited

UNITED STATES PATENTS

| | | | |
|---|---|---|---|
| 820,146 | 5/1906 | Simonds | 210/429 X |
| 1,898,816 | 2/1933 | Crossen | 210/431 |
| 1,965,368 | 7/1934 | Burnish | 210/232 |
| 2,519,805 | 8/1950 | Wilkins | 210/432 X |
| 3,399,776 | 9/1968 | Knuth | 210/234 |

FOREIGN PATENTS OR APPLICATIONS

| | | | |
|---|---|---|---|
| 68,026 | 2/1926 | Australia | 210/418 |

*Primary Examiner*—John Adee
*Attorney*—Donnelly, Mentag & Harrington

[57] ABSTRACT

A regulating station valve which is adapted to provide the functions of four valves, namely, a strainer, a regulating valve, and two shut-off valves in a single structure. The valve comprises a valve body having a chamber therein and provided with an inlet passage and an outlet passage, a first annular seal around said outlet passage in said valve body chamber, rotatable ball or cylinder valve seated on said first annular seal and a second annular seal seated against said rotatable valve at a point diametrically opposite to said first annular seal, and means for normally biasing said second annular seal against said rotatable valve to hold said rotatable valve in position in said valve body. A strainer means is rotatably mounted in said valve body for turning said rotatable valve between an open position and a closed position. The rotatable valve is provided with a high pressure fluid inlet chamber which is divided from a low pressure fluid outlet chamber so that high pressure fluid flowing through said rotatable valve enters the inlet passage and passes through the inlet chamber in the rotatable valve and thence through the strainer and into the valve body chamber. The fluid then flows back into the outlet chamber in the rotatable valve and thence out of the rotatable valve and into said outlet passage. A regulating valve means is also provided to control the flow of fluid from the valve body chamber into the rotatable valve outlet chamber. The outer surfaces of the rotatable valve direct fluid flow and also function to allow flow or stop flow.

21 Claims, 12 Drawing Figures

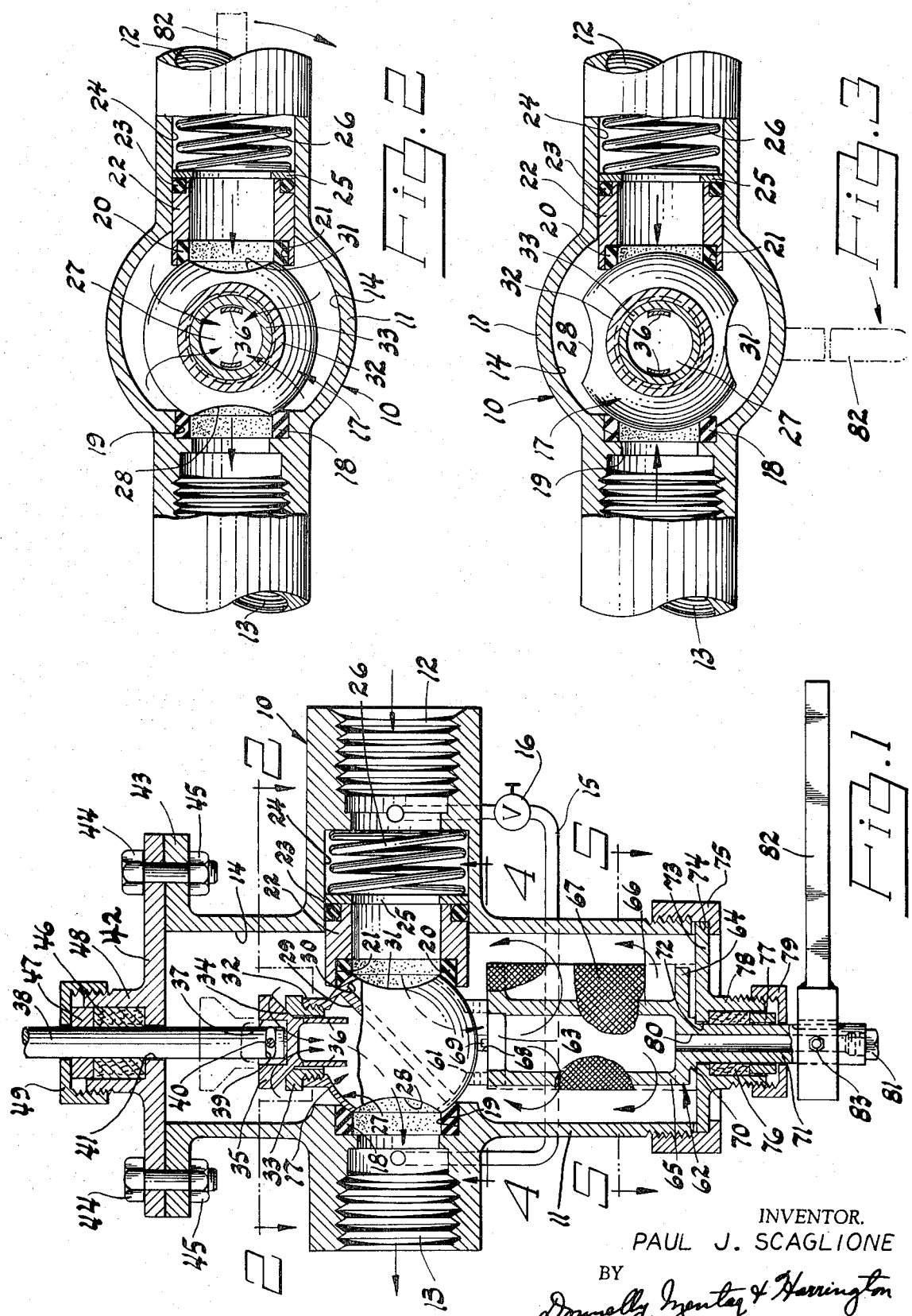

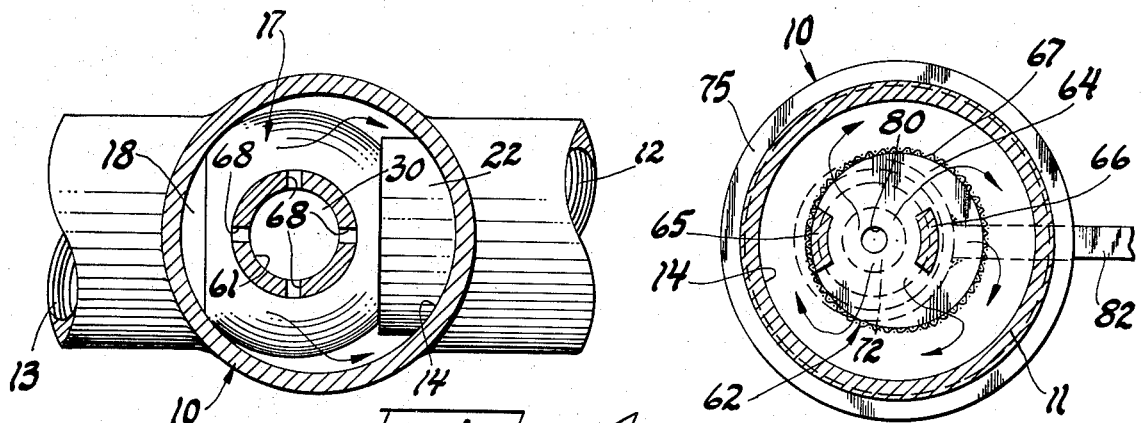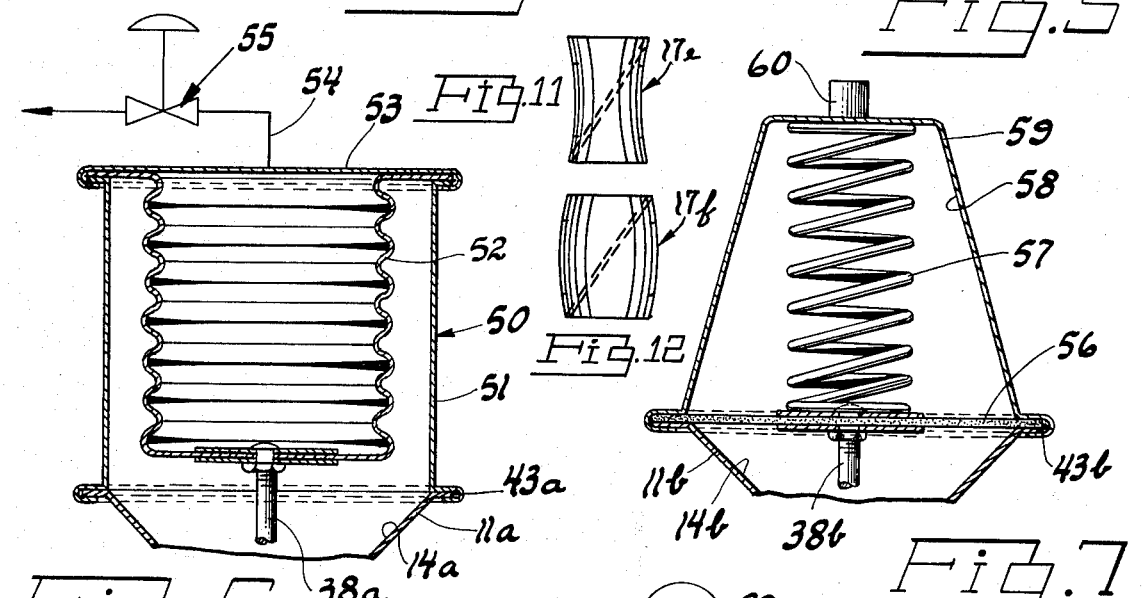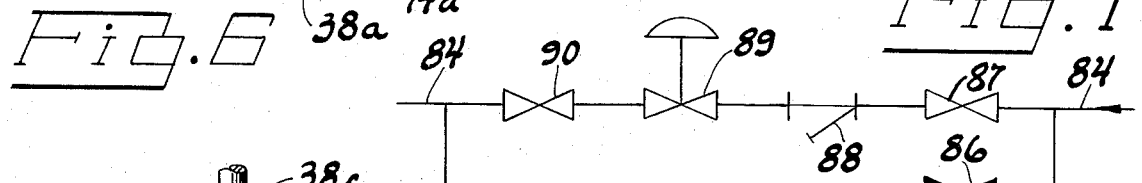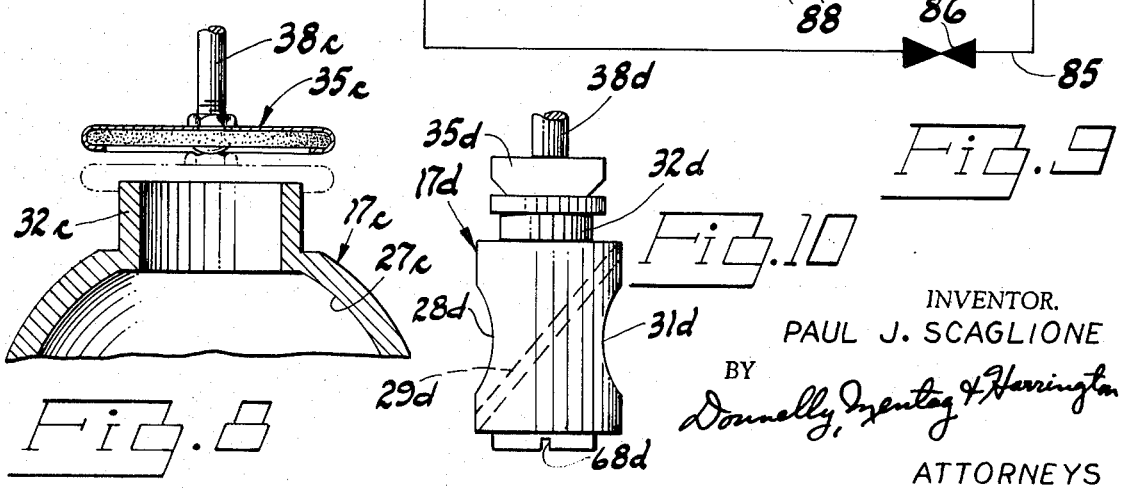

REGULATING STATION VALVE

SUMMARY OF THE INVENTION

This invention relates generally to regulating valves, and more particularly, to a regulating station valve which provides a straining function, a regulating function, and a fluid flow function.

In fluid flow systems where pressure or temperature regulation is required for air, gas or liquids, a pressure reducing valve or temperature regulating valve is required. Heretofore, in order to provide the required pressure or temperature regulation, it was common practice to install such pressure reducing valves or temperature reducing valves into what is commonly referred to as a valve station. The prior art valve stations comprise an upstream shut-off valve, a strainer, a regulator, and a second downstream shut-off valve. Also, a bypass pipe including a shut-off valve is provided so that the strainer and regulator may be bypassed for repair and service work on the strainer and the regulator. A disadvantage of the prior art valve stations is that they require a large amount of material to form the same and a great number of hours of labor to install a station. Another disadvantage of the prior art valve stations is that they require a large amount of space in a fluid flow or piping system. Still another disadvantage of the prior art valve stations is that they require much time to shut down a station and service the same. In view of the foregoing, it is an important object of the present invention to provide a novel and improved regulating station valve which overcomes the aforementioned disadvantage of the prior art valve stations.

It is another object of the present invention to provide a novel and improved regulating station valve which is adapted to provide the functions of a strainer, a regulating valve, and two shut-off valves in one unitary operating structure.

It is still another object of the present invention to provide a novel and improved regulating station valve which is simple and compact in construction, easy to install and service, and economical to manufacture.

It is still another object of the present invention to provide a novel and improved regulating station valve which functions to shut-off both upstream and downstream flows through a regulating valve and a strainer portion by a single 90° turn of a handle, as compared to the required two separate operations in the prior art valve stations for closing two shut-down valves in widely spaced apart positions.

It is a further object of the present invention to provide a novel and improved regulating valve station which includes a strainer apparatus and a regulating apparatus in a unitary valve body and wherein each may be removed from the valve body without removing the valve body from a piping system in which it is installed, so as to permit quick and efficient repair and service operations to the strainer apparatus and regulating apparatus.

It is still another object of the present invention to provide a novel and improved regulating station valve which includes a valve body having a chamber therein, a high pressure fluid inlet passage communicating with said valve body chamber and a low pressure fluid outlet passage communicating with said valve body chamber at a point diametrically opposite to the inlet passage, a first annular seal around one of said passages disposed at the point where said passage communicates with said valve body chamber; a rotatable valve in said chamber and being seated against said first annular seal, a second annular seal in said valve body chamber and disposed against said rotatable valve at a point diametrically opposite to said first annular seal, and, means for normally biasing said second annular seal against said rotatable valve to hold said valve in a rotatable seating relationship between said two annular seals. The rotatable valve includes a high pressure fluid inlet chamber divided from a low pressure fluid outlet chamber. The divided inlet and outlet chambers direct fluid flow and the outer surfaces thereof are used to allow flow through the station valve or stop flow therethrough.

Other features and advantages of this invention will be apparent from the following detailed description, appended claims, and the accompanying drawings.

BRIEF DESCRIPTION OF THE DRAWINGS

FIG. 1 is an elevational section view of an illustrative embodiment of a regulating station valve made in accordance with the principles of the present invention.

FIG. 2 is a horizontal section view of the structure illustrated in FIG. 1, taken along the line 2—2, looking in the direction of the arrows, and showing a ball valve disposed in an open position to allow flow through the valve.

FIG. 3 is a horizontal section view similar to FIG. 2, but showing the rotatable valve turned to a closed position to stop flow through the valve.

FIG. 4 is a horizontal section view of the structure illustrated in FIG. 1, taken along the line 4—4 thereof, and looking in the direction of the arrows.

FIG. 5 is a horizontal section view of the structure illustrated in FIG. 1, taken along the lines 5—5 thereof, and looking in the direction of the arrows.

FIG. 6 is an elevational section view of a bellows type control regulator.

FIG. 7 is a elevational section view of a diaphragm type control regulator.

FIG. 8 is a fragmentary view of a rotatable ball valve provided with a flat disc type ball seat.

FIG. 9 is a schematic illustration of a conventional regulating station in a fluid flow system.

FIGS. 10, 11 and 12 are side elevational views of three different types of cylindrical rotatable valves which may be used in the invention in lieu of the ball shaped valve.

DESCRIPTION OF THE PREFERRED EMBODIMENTS

Referring now to the drawings, and in particular to FIG. 1, the numeral 10 generally designates a regulating station valve made in accordance with the principles of the present invention. The valve 10 comprises a cylindrical body 11 which is provided with an inlet passage 12 which represents the high pressure side of the valve and with an outlet passage 13 which represents the low pressure side of the valve. The inlet passage 12 and the outlet passage 13 communicate at diametrically opposite sides with an internal cylindrical chamber 14. The inlet passage 12 is connectible with the outlet passage 13 through a by-pass pipe 15 and a shut-off valve 16.

The flow of fluid between the inlet passage 12 and the outlet passage 13 is controlled by a rotatable valve generally indicated by the numeral 17 and illustrated as having a ball shaped body. A ring or annular valve seal 18 is operatively mounted in a bore 19 formed at the inner end of the outlet passage 13 at the point where this passage communicates with the chamber 14. The rotatable valve 17 is positioned to abut the shaped valve seat on the inner face of the seal 18 which is shaped to rotatably receive the ball shaped surface of the rotatable valve 17. A second ring or annular valve seal 20 is biased against the other face of the valve 17 at a point diametrically opposite to the seal 18. The seal 20 is operatively mounted in a bore 21 which is formed on the inner end of a movable valve seat member collar 22. The valve seat member collar 22 is slidably mounted in a bore 24 which is formed on the inner end of the inlet passage 12. The movable valve seat member 22 is biased toward the valve 17 by a coil spring 26. A bearing washer 25 is disposed between the outer end of the movable collar 22 and the inner end of the spring 26. The movable collar 22 is provided with a suitable O-ring seal 23.

As illustrated in FIG. 1, the rotatable ball valve 17 is provided with a valve outlet chamber 27 which communicates through a valve outlet port 28 with the outlet passage 13. The outlet port 28 is adapted to be seated in alignment with the opening through seal 18 when the valve 17 is in the open position shown in FIGS. 1 and 2. The rotatable ball valve 17 is provided with an internal chamber wall 29 which is disposed at an angle relative to the vertical axis of the valve so as to divide the interior of the ball valve 17 into two chambers to provide a second chamber or inlet chamber 30. The valve inlet chamber 30 communicates through the valve inlet port 31 with the inlet passage 12, as shown in FIGS. 1 and 2, when the valve 17 is in the open position.

As shown in FIG. 1, the valve outlet chamber 27 is provided with an inlet port 32 in which is threadably mounted a valve seat element 33 that is provided with a cone-shaped valve seat 34. A cone-shaped valve element 35 is adapted to be seated on the valve seat 34 for controlling the flow of fluid through the inlet port 32. As shown in FIGS. 1 and 2, the valve element 35 is provided with a pair of guide rods or guide members 36 for guiding the movement of the valve element 35 relative to the valve seat element 33.

The valve element 35 is provided with an axial recess 37 on the upper end thereof, as viewed in FIG. 1, and in which is received the lower end of a valve operating stem 38. The valve operating stem 38 is provided on the lower end thereof with a transverse slot 39. A cross pin 40 is mounted through suitable holes in the valve element 35 and through the transverse slot 39. It will be seen that the valve operating stem 38 is connected by the last described structure to the valve element 35 in such a manner so as to permit the rotatable valve 17 to be self-adjusting or movable horizontally for aligning itself relative to the valve seats 18 and 20 due to wear of the contacting valve parts. It will be seen from FIG. 1 that the valve operating stem 38 and the valve 17 are mounted in an off-center position in the valve body 11.

As shown in FIG. 1, the valve operating stem 38 extends upwardly through a hole 41 in a top cover plate 42 which is releasably secured to a flange 43 on the valve body 11 by a plurality of bolts 44 and nuts 45.

The valve stem 38 extends into a packing chamber 48 in which is operatively mounted valve packing 46 that is secured in place by the ring 47 and the threadably mounted collar 49. It will be understood that the valve stem 38 may be operatively connected to any suitable type of operator, as for example, a bellows type operator shown in U.S. Pat. No. 3,493,008.

FIG. 6 illustrates a conventional bellows type control which may be used for controlling the opening and closing of the valve element 35. The numeral 50 generally designates the bellows control apparatus which comprises a cylindrical housing 51 in which is operatively mounted a bellows 52. The valve stem 38a is shown as being connected to the lower end of the bellows 52. The upper end of the bellows 52 is enclosed by a top end cover 53 to which is operatively connected a pilot line 54. The pilot line 54 is operatively connected to a suitable pilot valve 55. The parts which are similar to the parts of the embodiment of FIG. 1 are marked with the same reference numerals followed by the small letter a.

FIG. 7 illustrates a conventional diaphragm control type apparatus which may be employed for operating the valve stem 38b. The control illustrated in FIG. 7 comprises the membrane 56 which is secured on the upper end of the valve body 11b and to which is connected the valve stem 38b. The housing 59 is mounted on the valve body 11b and encloses the membrane 56. A spring 57 is operatively mounted in the chamber 58 within the housing 59. The numeral 60 generally designates a vacuum control fitting. The parts which are similar to the parts of the embodiment of FIG. 1 are marked with the same reference numerals followed by the small letter b.

As shown in FIG. 1, the valve inlet chamber 30 is provided with an outlet port 61 on the lower side thereof. The outlet port 61 is adapted to communicate with the upper end of a strainer which is generally indicated by the numeral 62.

As illustrated in FIGS. 1 and 5, the strainer 62 is illustrated as being circular in cross section. It will be understood, however, that it could have other shapes, as for example, it could be square in cross section. The illustrated strainer 62 comprises a round metal upper plate 63 which has a bore formed therethrough as shown in FIG. 1, and through which the fluid passing from the outlet port 61 passes. The strainer 62 further includes a lower round plate 64 which is spaced apart from the plate 63 and is connected thereto by a pair of elongated rods 65 and 66. It will be seen that the two metal plates 63 and 64 and the rods 65 and 66 comprise a screen holding frame and a turning device for turning the valve 17, as more fully described hereinafter.

As shown in FIGS. 1 and 5, a suitable cylindrical strainer screen 67 is slip-mounted over the holding frame and rests on the inner face of a bottom cover plate 73. The cover plate 73 is seated in an annular groove 74 in a threadably mounted collar 75 which secures the plate 73 to the lower end of a valve body 11.

As shown in FIGS. 1 and 4, the rotatable valve 17 is provided on the lower end thereof with a downwardly extended integral ring or projection on the bottom end of which is formed a plurality of downwardly opening slots 68 in each of which is received an upwardly extended ear 69 or drive lug formed on the upper end of the strainer top plate 63. The ears 69 fit into the slots 68 with a loose fit which permits self-adjusting movements of the valve 17 relative to the strainer 62.

The strainer lower plate 64 is provided with a downwardly extended projection 70 which forms a shoulder for seating on the inner face of the bottom cover plate 73. A strainer shaft 71 is integrally formed on the lower end of the shoulder 70 and this shaft extends downwardly through a hole 72 formed in the bottom cover plate 73 and into a packing chamber 78. A suitable packing 76 surrounds the shaft 71. A packing 76 is operatively retained in the packing chamber 78 by a packing ring 77 and a threadably mounted retainer collar 79. The shaft 71 is provided with a drain passage 80 which communicates the interior of the strainer with the atmosphere. The lower end of the drain passage 80 is normally closed by a threadably mounted drain plug 81.

As shown in FIG. 1, a turning handle 82 is operatively mounted on the lower or outer end of the shaft 71 by any suitable means, as by means of the set screw 83 and a suitable key means.

FIG. 8 illustrates the fact that although the cone type valve seat 34 may be used for some types of fluid, that in lieu thereof, a flat disc type seat may be used for other type fluids. As for example, for controlling the flow of air or gas, the flat disc type valve 35c may be used, and it may be provided with a suitable valve disc, as for example, a Teflon disc. The parts of the structure illustrated in FIG. 8 which are the same as the structure illustrated in FIG. 1 are marked with the same reference numerals followed with the small letter c.

FIGS. 10, 11 and 12 illustrates the fact that the rotatable valve 17 may be made with a cylindrical shape instead of a ball shape. The illustrated parts of the cylindrical valves 17d, 17e and 17f which are the same as the parts of the first embodiment of FIG. 1, are marked with the same reference numerals followed by the small letters d, e and f. FIG. 10 shows a cylindrically shaped valve 17d provided with longitudinal straight sides. FIG. 11 shows a cylindrically shaped valve 17e provided with longitudinal concave sides. FIG. 12 shows a cylindrically shaped valve 17f provided with longitudinal convex sides.

FIG. 9 illustrates a conventional regulating valve station. In many systems where pressure or temperature regulation is required for air, gas or other liquids, a pressure reducing valve or temperature regulating valve is required. It is common practice to install these valves in what is commonly referred to as a valve station. The illustrated valve station of FIG. 9 comprises an upstream shut-off valve 87 which is shown as being mounted in a fluid flow system 84. The valve station further includes a conventional strainer 88, regulating valve 89, and a downstream shut-off valve 90. A bypass pipe 85 and a shut-off valve 86 are also included to allow the system to operate while the shut-off valves 87 and 90 are closed to allow repair work to be made on the regulating valve 89 and cleaning work to be preformed on the strainer 88. FIG. 9 thus illustrates that prior art regulating valve stations include many more parts than apppplicant's aforedescribed novel regulating valve station.

In use, the operating handle 82 is disposed in a position shown in FIGS. 1 and 2 to permit flow through the regulating valve 10 from the upstream passage 12 to the downstream passage 13. When it is desired to remove the bottom plate 73 for cleaning sediment and dirt from the strainer 62, the handle 82 is moved clockwise, as viewed in FIG. 2, to the broken line position shown in FIG. 3. The rotatable valve 17, when in the position shown in FIG. 3, is in a position to block flow through the valve and permit the bottom cover 73 and the strainer 62 to be removed. It will be seen that the strainer cleaning operation and the making of repairs to the valve 10 may be made without the use of any expensive regulating valve station as illustrated in FIG. 9. Also, the cleaning operation can be commenced quickly with the closing of merely one valve.

It will be seen that when the rotatable valve 17 is in the open position shown in FIG. 2, that fluid enters the inlet passage 12 and passes through the port 31 and into the chamber 30. Fluid then passes downwardly through the port 31 and through the strainer 62, and into the chamber area exterior of the strainer 62. The fluid then passes upwardly around the outer surface of the valve 17 and thence through the inlet port 32 into the valve chamber 27. The fluid then passes from the chamber 27 out through the port 28 and into the discharge or outlet passage 13.

It will be seen that by a 90° turn of the handle 82, that all flow is stopped from two directions, namely the upstream and downstream, and that the regulating elements can be inspected or removed from the valve body 11. The novel self-adjusting collar seal ring 20 seals off the fluid from entering the valve body 11 and thus allows the removal of the pressure or temperature regulating valve stem as well as the strainer 62 from the valve body 11 without loss of fluid. The valve 10 can also be used as a common shut-off valve without interference from the regulating or strainer elements. The regulating stem 38 may also be disconnected and the valve can be merely used as a strainer with upstream and downstream shut-off capacity. One the other hand, by removal of the strainer elements 62, the valve can be used as a regulator with upstream and downstream shut-offs.

It will also be seen that the frame of the strainer 62 functions as a turning column for the rotatable valve 17 as well as a strainer screen holder and a collection chamber for all solids that collect within it from the fluid flowing therethrough. The strainer 62 also functions as a bottom support and guide to the valve 17. The valve 17 is held in a horizontal plane by the upstream and downstream seals 18 and 20 which are held fast by the self-adjusting collar member 22. It will also be seen that rotatable valve 17 comprises a physical body which directs fluid flow with its two divided internal chambers, with high pressure fluid in an inlet chamber and low pressure fluid in an outlet chamber. The outer surfaces of said physical body are used to allow fluid flow through the station valve or stop fluid flow.

While it will be apparent that the preferred embodiments of the invention herein disclosed are well calculated to fulfill the objects above stated, it will be appreciated that the invention is susceptible to modification, variation and change.

What I claim is:

1. A regulating station valve comprising:
   a. a valve body having a vertical elongated chamber therein, with the lower end of said chamber forming a sediment and condensate collection chamber;
   b. an inlet passage communicating with said valve body chamber and an outlet passage communicating with said valve body chamber at a point diametrically opposite to the inlet passage;
   c. a first annular seal around one of said passages disposed at the point where said passage communicates with said valve body chamber;
   d. a rotatable valve in said chamber and being seated against said first annular seal;
   e. a second annular seal in said valve body chamber and disposed against said rotatable valve at a point diametrically opposite to said first annular seal;
   f. means for normally biasing said second annular seal against said rotatable valve to hold said valve in a rotatable seating relationship between said two annular seals;
   g. said rotatable valve having a pair of chambers formed therein with one of said chambers comprising an inlet chamber having an inlet port communicating with said inlet passage and a downwardly opening outlet port communicating with the lower end of said valve body chamber, and the other of said pair of chambers comprising an outlet chamber having an upwardly opening inlet port communicating with said valve body chamber and an outlet port communicating with said outlet passage whereby fluid entering said inlet passage will pass through said rotatable valve inlet chamber and down into the lower end of said valve body chamber and thence upwardly around said rotatable valve and into said rotatable valve outlet chamber and into said outlet passage; and,
   h. means in the lower end of said valve body chamber releasably connected to said rotatable valve for rotating said rotatable valve to a first position to permit said flow of fluid from said inlet passage and through said rotatable valve to said outlet passage, and to a second position whereby the flow of fluid between the inlet passage and outlet passage is blocked by said rotatable valve, and said valve body being provided with a drain passage which extends to the exterior of said valve body for draining said valve body collection chamber.

2. A regulating station valve as defined in claim 1, including:
   a. valve means for regulating the flow of fluid from said valve body chamber into said rotatable valve outlet chamber.

3. A regulating station valve as defined in claim 2, wherein:
   a. said valve means comprises a valve seat formed on said inlet port of said rotatable valve outlet chamber, and a valve stem carrying a valve element operatively mounted in said valve body for opening and closing relationship with said valve seat to control flow of fluid through said last mentioned inlet port.

4. A regulating station valve as defined in claim 3, wherein:
   a. said valve stem is self-adjustably attached to said valve element.

5. A regulating station valve as defined in claim 3, wherein:
   a. said valve stem is attached to said valve element by a cross pin which is mounted in the valve element and which has the ends thereof slidably mounted in a pair of transverse slots formed on opposite sides of a recess in said valve element.

6. A regulating station valve as defined in claim 1, including:
   a. a strainer means operatively mounted in said valve body chamber and operatively connected to the outlet port of said rotatable valve inlet chamber for straining the fluid passing through said last mentioned inlet chamber and into said valve body chamber.

7. A regulating station valve as defined in claim 6, wherein:
   a. said means for rotating said rotatable valve comprises a strainer supporting frame for said strainer means, means for releasably connecting said strainer frame to said rotatable valve for turning said rotatable valve when said strainer is turned, and means for turning said strainer supporting frame.

8. A regulating station valve as defined in claim 7, wherein:
   a. said means for releasably connecting said strainer frame to said rotatable valve comprises a self-adjusting means to permit self-adjusting movements of said rotatable valve relative to said strainer means.

9. A regulating station valve as defined in claim 7, wherein:
   a. said strainer means is provided with a drain passage which extends to the exterior of said valve body to permit draining of said strainer without removing the same from the valve body.

10. A regulating station valve as defined in claim 1, wherein:
    a. said means for normally biasing said second annular seal against said rotatable valve includes a collar member slidably mounted in said valve body, and a spring for normally biasing said collar and second annular seal against said rotatable valve.

11. A regulating station valve as defined in claim 1, wherein:
    a. said rotating valve is ball shaped in outer configuration.

12. A regulating station valve as defined in claim 1, wherein:
    a. said rotating valve is cylindrically shaped.

13. A regulating station valve as defined in claim 12, wherein:
    a. said cylindrically shaped rotating valve has longitudinal straight sides.

14. A regulating station valve as defined in claim 12, wherein:
    a. said cylindrically shaped rotating valve has longitudinal concave sides.

15. A regulating station valve as defined in claim 12, wherein:
    a. said cylindrically shaped rotating valve has longitudinal convex sides.

16. A regulating station valve as defined in claim 3, wherein:

a. said valve seat is conically shaped, and said valve element is conically shaped.

17. A regulating station valve as defined in claim 3, wherein:
a. said valve seat is flat, and said valve element is a flat disc.

18. A regulating station valve as defined in claim 2, including
a. a strainer means mounted in said valve body chamber and operatively connected to the outer port of said rotatable valve inlet chamber for straining the fluid passing through said last mentioned inlet chamber and into said valve body member.

19. A regulating station valve as defined in claim 18, wherein:
a. said means for rotating said rotatable valve comprises a strainer supporting frame for said strainer means, means for releasably connecting said strainer frame to said rotatable valve for turning said rotatable valve when said strainer is turned, and means for turning said strainer supporting frame.

20. A regulating station valve as defined in claim 19, wherein:
a. said means for releasably connecting said strainer frame to said rotatable valve comprises a self-adjusting means to permit self-adjusting movements of said rotatable valve relative to said strainer means.

21. A regulating station valve as defined in claim 1, wherein:
a. said rotatable valve includes inner surfaces which are arranged to form said inlet and outlet chambers and direct fluid flow through the station valve between said inlet passage and said outlet passage when the rotatable valve is rotated to a first position; and,
b. the outer surface of said rotatable valve is formed to stop flow between said inlet and outlet passages when the rotatable valve is rotated to a second position.

* * * * *